United States Patent [19]
Hodzic et al.

[11] Patent Number: 6,097,707
[45] Date of Patent: *Aug. 1, 2000

[54] ADAPTIVE DIGITAL WIRELESS COMMUNICATIONS NETWORK APPARATUS AND PROCESS

[76] Inventors: Migdat I. Hodzic, 11633 Bridge Park Ct., Cupertino, Calif. 95014; James M. Brennan, 1224 Martin Ave., Apt. #5, San Jose, Calif. 95126

[*] Notice: This patent is subject to a terminal disclaimer.

[21] Appl. No.: 08/444,553

[22] Filed: May 19, 1995

[51] Int. Cl.$^7$ ........................................................ H04J 3/16
[52] U.S. Cl. .......................... 370/321; 370/337; 370/347; 455/54.1; 455/57.1
[58] Field of Search ..................... 370/24, 26, 29, 370/18, 55.3, 68.1, 77, 85.2, 79, 85.3, 84, 94.1, 94.3, 85.7, 95.1, 85.8, 95.2, 95.3, 100.1, 103, 104.1, 105, 105.1; 379/58, 63, 59; 340/825.06, 825.07, 825.08; 455/33.1, 33.4, 16, 15, 49.1, 51.1, 54.2, 53.1, 54.1, 57.1; 375/200, 202, 205

[56] References Cited

U.S. PATENT DOCUMENTS

| | | | |
|---|---|---|---|
| 4,644,534 | 2/1987 | Sperlich | 370/95.3 |
| 5,129,096 | 7/1992 | Burns | 455/33.1 |
| 5,212,805 | 5/1993 | Comroe et al. | 455/33.1 |
| 5,276,686 | 1/1994 | Ito | 455/33.1 |

*Primary Examiner*—Benedict V. Safourek
*Assistant Examiner*—Ricky Q. Ngo
*Attorney, Agent, or Firm*—Donald J. Lisa

[57] ABSTRACT

A single channel wireless digital communication network [10] has a cellular topology which includes a central unit [12] ("CW") controlling communications with a plurality of remote units [14] ("TU") in a star configuration. Network access is synchronously controlled through a time division multiplexed cycle [20] of variable total duration having an up-link phase [21] of a variable number of fixed size time slots [25, 27, 27a], each pre-assigned by reservation by a remote unit, and a down-link phase [22] of a variable number of variable size slots [31a, 31b] which are adaptively utilized. The CU adaptively manages all slot assignments according to a variety of parameters. RU up-link slot reservations are confirmed by the CU in a variety of ways. During the up-link phase, RU's which did not reserve a slot on the previous up-link cycle are temporarily suspended and are then polled or periodically tested for re-entry. A repeater unit [15] ("RU") having a back-to-back coupled ccu-tu pair operates as a minicell within the major cell where major cell coverage is not broad enough to reach all major cell TU's.

50 Claims, 3 Drawing Sheets

ADAPTIVE DIGITAL WIRELESS COMMUNICATIONS NETWORK APPARATUS AND PROCESS

BACKGROUND OF THE INVENTION

1. Field of the Invention

The present invention relates generally to the apparatus and methods of controlling multiple access to a communication network by a plurality of remote stations, and more particularly, to a non-contention, digital, wireless system in which all stations share one channel and a central station synchronously controls access through a cyclic, time division multiplex process.

2. Discussion of Background and Prior Art

Modern communications systems must be designed to meed a wide variety of practical applications which have varying needs.

a. MOBILITY

One important need is mobility. Increasingly in our society there is a requirement for mobile communication systems which eliminate expensive wire pulling, such as, in multi-building and various campus environments.

There is a need for and it is an object of the present invention to provide omnidirectional short range communications within buildings and between adjacent building structures without running phone lines and without interferences from the wall or building structures.

b. DIGITAL

Digital communications systems are dramatically pushing out our communications frontiers because of the flexibility and reliability of digital techniques. Nevertheless, in multi-point-to-point or multi-point-to-multi-point networking systems between multiple radio units, there is a need for and it is an object of the present invention to provide such a system which handles digitized video, audio and data at error-free and higher through-put rates.

c. LOW COST

Cellular topology has found wide acceptance worldwide in multi-point-to-point and multi-point-to-multi-point networks. The use of a cellular structure in wireless communications systems eliminates the need for telephone lines and cable lines. A vast infra-structure of cellular radio towers now exist worldwide.

Wireless networks are especially well adapted for use in cellular topology because they can be formed by combining numerous single cells to accommodate particular applications. Different cells would use different spreading codes to minimize the potential interference problems. There is a need for and it is an object of the present invention to provide a wireless radio frequency communications network which can utilize the existing worldwide cellular infra-structure in a variety of practical commercial applications.

d. EFFICIENT ORGANIZATION

A star configuration is an efficient organization for controlling multiple access of numerous remote units in a single cell communication scheme. The central unit acts as the control or master while the remote or terminal units act as slaves so far as channel access and scheduling are concerned. The remote units can communicate between each other via corresponding central units which can also act as repeaters. Constant monitoring of remote units by the central control improves the reliability of the network. There is a need for and it is an object of the present invention to provide a wireless, single channel, media access control which has the efficiencies of a star configuration.

e. REMOTE COVERAGE

In cellular, star configuration, multi-point-to-point systems, major problems have been the fading of the broadcast signals at the far corners or remote areas of a covered region and interference from multiple transmissions.

Spread spectrum technology is well known and has been available since World War II. Spread spectrum is a technique that uniformally distributes the information bandwidth of a data signal over a frequency range that is much larger than required for transmission. The technique adds redundancy to the signal, which allows data to be recovered in the presence of strong interfering signals. It has wide commercial application in digital wireless networks to avoid interference and provide reliable signal detection in the presence of multiple signal sources. Two fundamental techniques for spreading the digital bandwidth over a wide spectrum are well known and include direct-sequence and frequency hopping. In the basic direct-sequence technique, a base band data signal is combined with a pseudo-random noise ("PRN") code using an exclusive-OR ("XOR") gate.

The out-put is a combined signal with a "chipping rate" much faster than the data-signal rate which spreads the signal over a frequency range larger than the data-signal bandwidth which is then demodulated coherently by conventional techniques at the receiver end.

Thus, in spread spectrum the data and spread signals are combined. The spreading signal dominates the content. The combined signal looks like noise, but is correlatable because the spread spectrum has a unique code that can be detected and demodulated.

In a typical multi-point-to-multi-point system the central control unit functions as a repeater for remote terminal units where the coverage of the major cell central unit is insufficient to reach all remote units within the major cell.

There is a need for and it is an object of the present invention to provide the advantages of spread spectrum and repeater capability in a digital wireless network of broad practical application.

f. LIMITED SPECTRUM AND MEDIA ACCESS CONTROL

The limited spectrum for radio frequency broadcasting has long been a major problem for communications systems. The need to effectively and efficiently use existing spectrum has spawned many new types of systems and capabilities. Multi-point-to-point wireless systems have created multiple access problems as multiple units contend for channel availability. Single channel systems have aggravated the need for good multiple access control of the media. Numerous channel access schemes are well known including frequency division multiple access ("FDMA"), code division multiple access ("CDMA"), and time division multiple access ("TDMA").

In FDMA, the total spectrum assignment is divided into channels in the frequency domain. A major disadvantage of the FDMA system is that it requires considerably more equipment at the base station to handle a given number of subscribers.

CDMA is the characteristic form of multiple access that is used for spread spectrum systems. In these systems each unit is assigned a unique randomized code sequence, different from all other users. Spread spectrum systems utilize a single wide band carrier, and, thus, in CDMA systems a large number of users can transmit simultaneously, resulting in the bandwidth being very wide when compared to either TDMA or FDMA.

The problem with CDMA is that the spreading signal requires more bandwidth. A second major problem with CDMA is "near-far" affect in which mobiles close to the base drown out those which are far away. Another problem is that diverse communications traffic needs may require different bandwidth and performance requirements to coexist within a given network. Thus, a multi-access protocol must be capable of satisfying such diverse requirements. There is a need for and it is an object of the present invention to provide the advantage of CDMA in a wireless system where its disadvantages are minimized.

With TDMA the channels are multiplexed by time division so that each channel accesses the full bandwidth for a short time slot. The total number of simultaneous users is limited by the number of time slots that are available and users only use the channel during specific time slots. The major advantage of TDMA systems over FDMA is the reduced cost of central site equipment, which arises because each radio channel is effectively shared by a much larger number of subscribers. Additionally, TDMA has more flexibility and is more open to technology change. *Santa Maria* and *Lopez-Hernandez, Wireless LAN Systems, Artech House. Inc.* (1994). At p. 210–212. Thus, there is a need for and it is an object of the present invention to apply the advantages of TDMA to a digital wireless single channel non-contention communication network.

The world's most widely used digital cellular system is the European standard known as GSM which originally stood for Groupe Special Mobile, but now stands for Global System for Mobile communications and is designed to allow subscribers to use the same terminal equipment throughout all the territories where GSM has been adopted. This system is a fully digital network in the 900-MHz band. However, the GSM is not a single channel non-contention network.

Single-channel non-contention systems relieve subscriber devices operating on the network from having to detect collisions. Cyclic TDM approaches is one such implementation. Some TDM systems use a token passing ring. Others use fixed slot allocation or dynamic slot allocation. In a fixed slot allocation system, regularly occurring time slots in a repetitive framed sequence are dedicated to specific devices operating on a network for their transmission. In dynamically allocated systems, parameters, such as, the size of each time slot and the number of time slots allocated to a particular device may be varied. Since a device only transmits during its allocated time slots, communication collisions generally do not occur. See Budin U.S. Pat. No. 5,276,703 (4:11–21).

Multi-point digital wireless communications networks are also well known. In one system to Gilbert U.S. Pat. No. 5,297,144 a non-contention based, single optical-infrared channel, star configuration network using a central station to control access of multiple remote stations in a cyclic, synchronized, TDMA process is described. This patent describes a reservation period and a polling period protocol during which reserving stations from the first period are polled sequentially for data transfer in the second period. The system does not describe a wireless radio frequency link and suffers from less than optimal utilization of the channel.

In another system to Ahl U.S. Pat. No. 5,313,461 a single channel, spread spectrum, star network, wireless, digital communication network is described in which the common resource is adaptively shared as a function of traffic going to and from the remote units. A TDMA process is disclosed in which segments of user data are analyzed by the system with respect to content and amount and slices are dynamically and adaptively assigned based on that analysis. While time slices which will not be used during a particular frame due to the lack of or the repetitive nature of information from a particular switching unit can be temporarily used to transfer information from a different switching unit, this system does not describe a reservation system where requesting peripherals can reserve a slot for a subsequent cycle, nor a suspending of inactive remote units with provision for their subsequent re-entry.

Thus, there is a need for and its is an object of the present invention to provide an adaptive process for assigning up-link slots based on advance reservation by remote units and to optionally manage the allocation of available capacity to served units.

Due to the adaptive nature of the present invention, there is a need for and it is an object of the present invention to provide the overall network with a dynamic reconfiguration capability where one or more of the remote units can be removed from the network or inserted back into it without disturbing the normal network operations such that removed remote units do not waste any system bandwidth which contributes to efficient use of communication links.

There is also a need for and it in a further object of the present invention to provide a flexible adaptive network that has the capability to be easily reconfigured to meet a wide range of applications, while providing long range (over 20 miles) and high data through-put. Typical proprietary (vertical)applications include general security (audio, CCTV, alarm, etc) and security for high-rise buildings and gated communities; utilities; traffic management; rural telecommunications; and ATM monitoring; to name a few. Typical subscriber (horizontal) applications include remote access to on-line services (Internet, etc.); remote access to corporation networks, and general mobile wireless data communication applications; to name a few.

SUMMARY OF THE INVENTION

Set forth below is a brief summary of the invention which achieves the forgoing and other objects and advantages in accordance with the purposes of the present invention as broadly described herein.

One aspect of the invention is in a single channel, star configuration, wireless digital communication network of cellular topology wherein a central control unit is radio frequency linked to a plurality of remotely controlled units and multiple access is synchronously controlled by the central unit through a time division multiplexed cycle having a total cycle time of variable duration divided into two phases, including an up-link phase followed by a down-link phase, each phase having a plurality of time slots in which information is transferred between units, wherein the improvement comprises in the up-link phase, a variable number of fixed size time slots, each pre-assigned on request of a remote unit in a prior up-link phase for the next up-link phase, and in the down-link phase, a variable number of variable size time slots.

A feature of this aspect of the invention is the request being in the form of a flag set in an information frame transmitted by the requesting remote unit to the central unit in the prior up-link phase.

In this aspect of the invention a synchronization frame is transmitted simultaneously to all remote units at the beginning of each up-link phase, and an acknowledgement frame is transmitted simultaneously to all remote units in the network at the end of each up-link phase. The up-link time slots within which each remote unit transmits information to the central unit are of equal duration.

A confirmation signal in the acknowledgement frame broadcast by the central unit is addressed to and received by each remote unit for whom a slot has been allocated in the next up-link cycle. Thus, each remote unit is able to locate its pre-assigned time slot in an up-link cycle, for example, by simply counting the number of remote units scheduled by the central unit for transmission ahead of itself in the up-link cycle.

A further feature of this aspect of the invention is that the number of down-link time slots is managed by the central unit according to of the number of remote units for whom the central unit has information to be transmitted, and the size of a down-link slot for a remote unit is similarly managed according to the payload scheduled by the central unit for the remote unit.

Another aspect of the invention is a suspend mode omitting assignment of an up-link time slot in the next up-link phase for any remote unit which did not request one in a current up-link phase.

A feature of this aspect of the invention is that suspended stations are queried in any of a number of ways to determine whether they are ready to re-enter the up-link phase of the network, such as, by a polling signal transmitted by the central unit to each suspended remote unit to indicate reservation of an up-link slot for the remote unit in the next up-link phase. The polling signal may be a confirmation bit set by the central unit in the acknowledgement frame transmitted by the central unit to all remote units at the end of an up-link phase.

A further feature of this aspect of the invention is that the polling signal may be transmitted every k cycles to each suspended remote unit to indicate reservation of an up-link slot for the remote unit in the next up-link phase, where k is an integer.

A further aspect of the invention is the network operating in a spread spectrum.

Another aspect of the invention is the central unit and its associated plurality of remote units forming a major cell with a repeater unit having a local remote unit-local central unit pair coupled back to back to operate as a mini-cell within the major cell. The local remote unit operates on the same spread spectrum code as the major cell central unit, and the local central unit operates on a different spread spectrum code.

A further feature of this aspect of the invention is frames from the major cell central unit received by the local remote unit of the back to back pair are passed through a UART channel of the local remote unit to a UART channel of the local central unit which in turn acts as a central unit to other remote units in the minicell, and vice versa, whereby the local remote unit also acts as a regular remote unit also in the major cell.

Thus, in summary, a major aspect of one embodiment the invention is the variable number of up-link slots is adaptively allocated by the central unit on demand by remote units with non-requesting units being temporarily suspended from the up-link phase of the network until ready to re-enter.

A further aspect of the present invention is the variable number and size of down-link slots is adaptively allocated by the central unit based on the presence and amount of information for transmission to the remote units.

DETAILED DESCRIPTION OF THE PREFERRED EMBODIMENT

The detailed description is divided into five sections. Section 1 describes an overview of the network. Section 2 sets forth an overview of the adaptive time division multiple access ("TDMA") media access control ("MAC") layer protocol of the present invention. Section 3 describes the frame formats used. Section 4 describes the scheduling method on the shared radio channel. Section 5 presents the method for operating a Repeater Unit 15 explaining how a repeater can relay information from one remote region to a CCU 12 and vice versa.

1. OVERVIEW OF WIRELESS NETWORK TOPOLOGY

Figure 1:
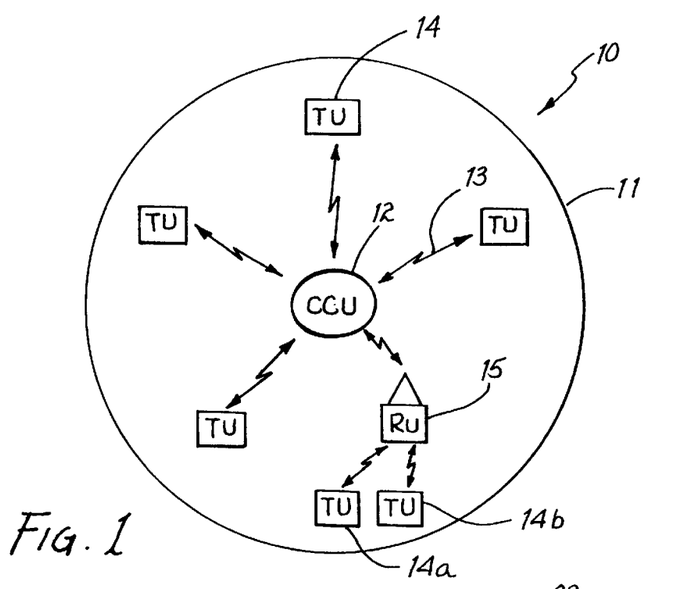
FIG. 1 is a schematic diagram of the cellular structure of a wireless digital communications network employing the present invention.
Figure 4:
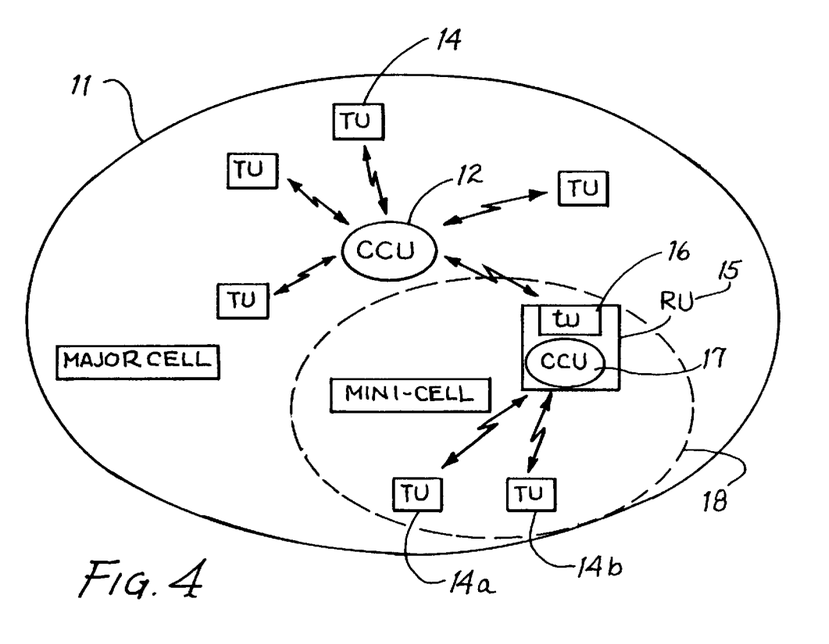
FIG. 4 is a schematic diagram of a minicell within a major cell of the present invention.

As shown in FIGS. 1 and 4 wireless network 10 of the present invention is based on a cellular topology. A single cell 11 includes a region covered by a single radio broadcast service. The cell 11 includes a single Central Control Unit ("CCU") 12 and plurality of remote or terminal units ("TUS") 14 each of which is radio frequency linked 13 to the CCU 12. In areas of the cell 11 where the radio coverage does not reach a particular Terminal Unit, a Repeater Unit ("RU") 15 is used to relay frames between remote TUs 14a and 14b and the CCU 12.

2. OVERVIEW OF TIME DIVISION MULTIPLE ACCESS MEDIA ACCESS CONTROL PROTOCOL

Figure 2:
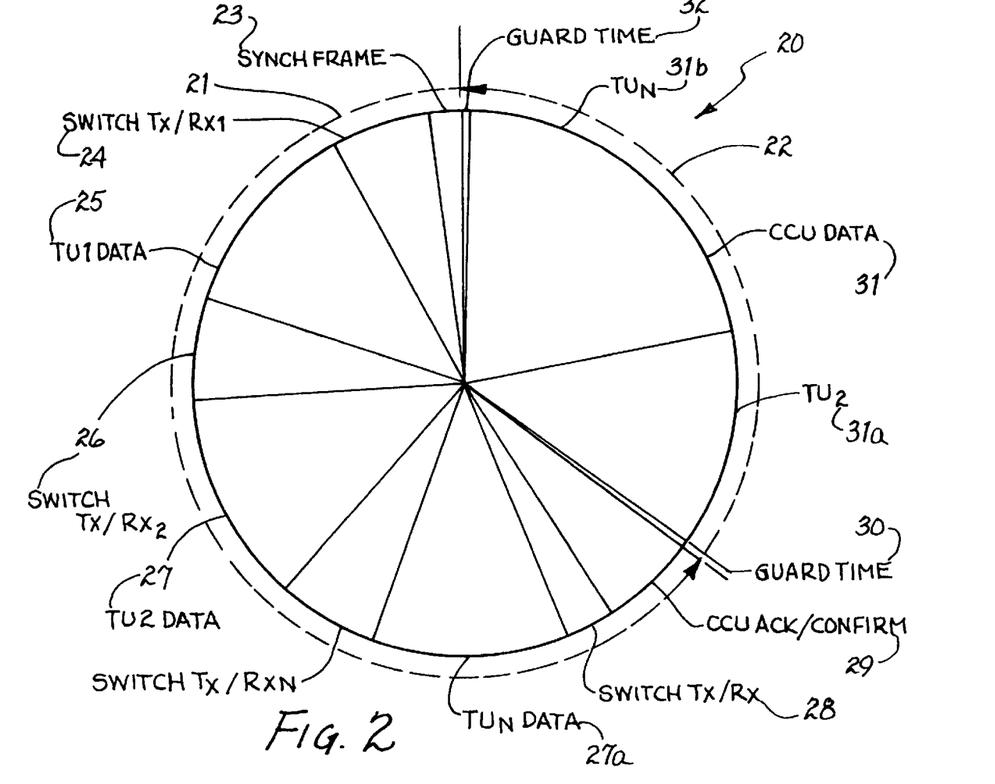
FIG. 2 is a schematic diagram of a complete cycle of a wireless communications network employing the present invention showing an up-link phase and a down-link phase of an adaptive time division multiplex access process having 3 terminal units of which only 2 terminal units are transmitting in the cycle presented.

As shown in FIG. 1, a single wireless cell 11 including a single CCU 12 and multiple TUs 14 is arranged in a star configuration. The CCU 12 is the cell controller. A TU 14 radio frequency linked 13 to CCU 12 represents a data terminal device, such as, a computer, a digital camera, a digital monitor, a computer terminal or the like. Media access control protocol for the present invention employs an adaptive TDMA process or cycle 20. The cycle 20 of typical scheduling for media access is depicted in FIG. 2. A total cycle is divided into two phases, an up-link phase 21 followed immediately by a down-link phase 22. The total cycle duration is variable as explained below.

Figure 3:
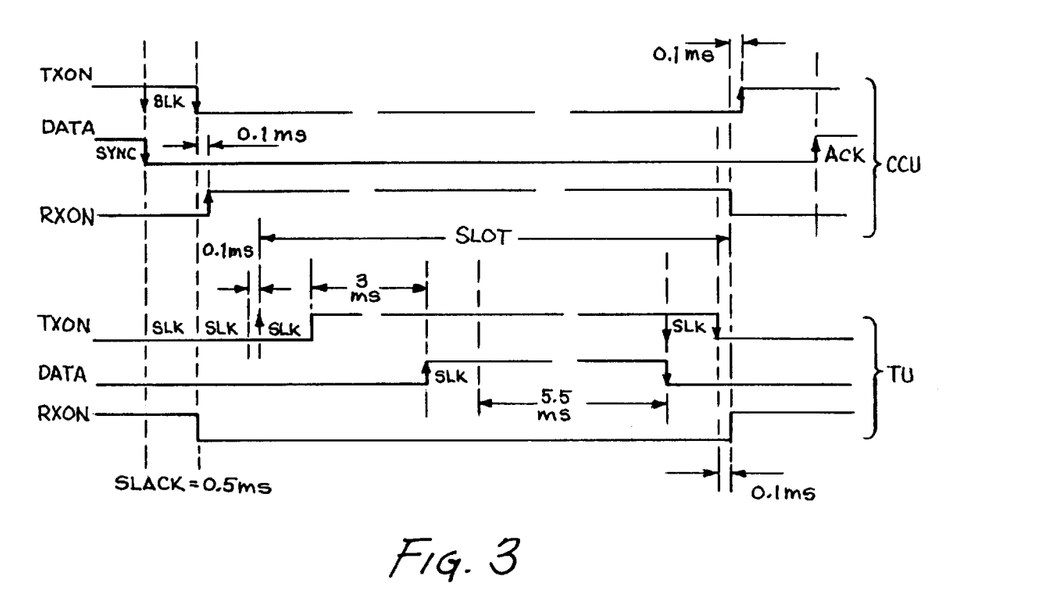
FIG. 3 is a timing diagram for a typical cycle for an adaptive time division multiple access protocol using the present invention.

The up-link phase 21 of the cycle 20 starts with the CCU 12 broadcasting a synchronization frame, ("Synch") 23. All TUs 14 in the cell 11 use the Synch frame 23 to schedule their access to the shared channel. As described below in greater detail, TU's 14 will know how many other TU's 14 are scheduled ahead of themselves in an up-link phase, and will be able to count slots to find their assigned slot to transmit in. TUs 14 are required to monitor the channel and determine whether the CCU 12 had allotted an up-link slot for them in the next up-link cycle. As will be seen below, this task is accomplished by a TU's receipt of an addressed confirmation bit set in the acknowledgement frame 29 by CCU 12. The CCU 12 switches to a receive mode 24 after transmitting the Synch frame 23. (FIG. 3). The protocol provides for a specific time slot 25, 27a, allocated by the CCU 12 by demand (e.g. by request or reservation) from a TU 14 in a prior up-link phase for the next up-link phase. Each up-link slot is of equal duration or size during which a single data frame is transmitted from the TU 14 to the CCU 12. Only during its allotted up-link time slot is a TU allowed to transmit. For example, as shown in FIG. 2, TU 1 is only allowed to transmit in slot 25, TU 2 in slot 27, $TU_N$ in slot 27a etc. If a TU, for some reason, misses the Synch frame 23, it loses its turn to transmit during the current cycle 20. When all selected TUs 14 finish transmitting their frames, they revert to the receive mode and the CCU 12 switches to the transmit mode 28. (FIG. 3). As described below in greater detail the CCU 12 broadcasts a special fixed size Acknowledgement ("Ack") frame 29 directed from the CCU 12 to all TUs 14.

Next, the down-link phase 22 immediately follows. The CCU 12 follows the Ack frame 29 by broadcasting down-link data frames 31 directed to the respective TUs 14 for whom the CCU has traffic. During the down-link phase the total number of down-link slots is variable. The CCU 12 may transmit zero frames up to the number of TUs in its cell, with a maximum of one frame per TU. These frame slots, however, are of variable sizes depending on the size of the payload (presence and amount of information) intended to be transmitted by the CCU 12 to each respective TU 14 for whom it has traffic. As seen in FIG. 2 the CCU 12 has downloaded data frames of different sizes for $TU_2$ and $TU_N$ only and had no data message for $TU_1$. Upon completion of the transmission of data frames to the TUs 14, the CCU 12 sends the next Synch frame 23 to start another up-link phase 21 of a new cycle 20. Different cycles 20 may have different total durations of time. In this manner a CCU 12 acts as a frame relay between TUs 14 in the same cell, as well as with TUs 14 that may reside in different cells (not shown). In the latter case, the local CCU 12 forwards frames 31 to a remote CCU 12 (not shown) where the target TU 14 (not shown) is located.

3. FRAME FORMATS

Figures 2A, 2C:
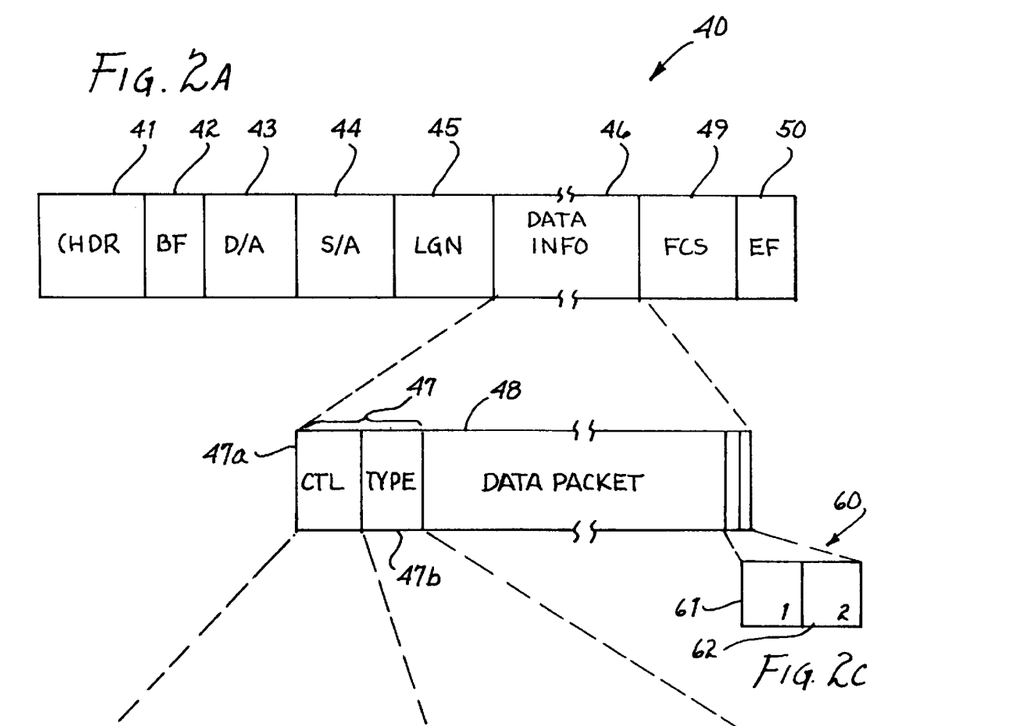
FIG. 2A is a schematic representation of the channel frame format used in the multiple-access signalling protocol of the present invention shown in FIG. 2.
FIG. 2C is a schematic representation of a 2-bit acknowledgement/confirmation field format used in the data packet field of an HDLC frame format use by a central control unit of the present invention.
Figure 2B:
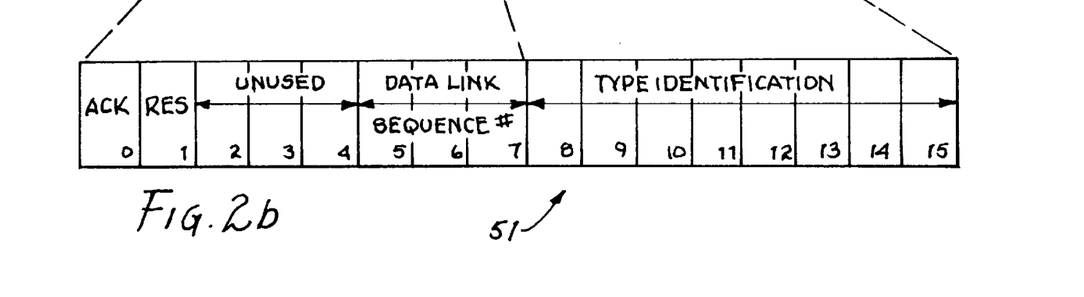
FIG. 2B is a schematic representation of a 2-byte, 16 bit control field format used in an HDLC frame format of the present invention shown in FIG. 2A.

The MAC layer protocol employs three types of frames: Synch 23, Data 31, and Ack 29. The digital hardware used in the preferred embodiment is a Motorola 68302 processor. However, other processors are known and may also be used such as an Motorola 68360. Since transmission over the radio channel preferably employs the HDLC capabilities of the Motorola 68302, all frame formats are based on the format of an HDLC frame 40 one embodiment of which is shown in FIGS. 2A, 2B. HDLC frame 40 comprises a plurality of individual fields wherein each field is comprised of a number of 8-bit bytes. Applicant stresses, however, that this format is only one of many that are conventional and will work in the protocol of the present invention. As seen in FIG. 2A HDLC frame 40 has as its first field a header or preamble 41, followed by a special beginning frame or start delimiter field 42 of 1-byte, followed by a 2-byte destination address field 43, followed by a 2-byte source address field 44, followed by a frame length field 45, followed by a variable length information field 46 which includes a two part control field 47, having a 1-byte control field portion 47a and a 1-byte type field portion 47b, and a variable length data packet 48, followed by a 4-byte frame check sequence or CRC field 49, and terminated by an end frame or end delimiter field 50 of 1-byte. As more fully described below and as seen in FIG. 2, to identify each frame type, the type field 47b of the control field 47 of an HDLC frame 40 is programmed with a special code for each type as more fully described below. The data field of the HDLC frame 40 is used to carry the relevant information for the respective MAC layer frame.

a. SYNCHRONIZATION FRAME

A CCU 12 broadcasts a Synch frame 23 at the beginning of each up-link phase 21 of cycle 20. In destination address field 43, HDLC frame 40 uses the FFFF hex address for broadcast addressing to be received by all stations. The HDLC type field 47b is programmed for the Synch frame with the identification byte AD hex. The identification flag field 47b consists of four repeats of the type field code AD hex, namely: ADADADAD hex. Additionally, a 32-bit identification flag (not shown) is also used in the HDLC data field 48 for redundant recognition of the Synch frame 23. (It is important that no remote unit 14 miss the Synch frame 23 which synchronizes the entire network.) These identification flags can be used to recognize the Synch frame even if the HDLC frame has CRC errors. The CRC field 49 is generated automatically by the Motorola 68302 when its Serial Control Channel, SCC, is programmed in the HDLC mode.

b. DATA FRAME

The HDLC Data frame 40 has a variable size data packet field 48 ranging between 23 octets and 128 octets. It is generated in the CCU 12 to forward data to a TU 14 during down-link phase 22. When used by the CCU 12, the Data frame 40 has a variable length data packet field 48 which is reflected in the variable size of the down-link slots 31. It also is generated in the TU 14 to send data to the CCU 12 during up-link phase 21. When used by the TU 14, the Data frame 40 has a data packet field 48 of variable length, but which is restricted by the fixed size of the up-link slots 25, 27. Thus, if a TU 14 uses only a few of the octets in the HDLC data packet field 48 of a data frame 40 which do not fully occupy up-link slots 25, 27a, the balance of those slot widths would be unused. Conversely, if the length of the data packet field 48 of a data frame 40 was so long that the data frame 40 exceeded the length of slot 25, 27, 27a, duration, some of the data would be lost.

The 2-byte 16-bit HDLC frame 40 destination 43 address field is used to identify the CCU 12 address when data is directed from a TU 14 to CCU 12, while it is used to identify the selected TU 14 address when data is directed from CCU 12 to TU 12.

The 2-byte, 16-bit HDLC frame 40 control field 47, shown generally at 51 in FIGS. 2A, 2B, is used to indicate the status of the last transaction and the data-link sequence number in control field 47a, and the type of data frame in type field 47b. As seen in FIG. 2B control field 47,51 is programmed as follows:

Bit 0 is a data link acknowledgement ("DLack"). In the case of data frames from a TU 14 to a CCU 12, a zero indicates a TU 14's positive acknowledgement of receipt of CCU 12's data frame 31. This field is ignored in the case of data frames from the CCU 12 to a TU 14 (The CCU 12 uses the acknowledgment frame 29 to acknowledge all transmissions from all TUs 14 at once).

Bit 1 is used by a TU 14 in the present up-link phase 21 to make a request or reservation, directed to the CCU 12, for allocation of a slot 25, 27, 27a during the next up-link phase 21 of the next cycle 20.

Bits 2–4 are reserved for future use.

Bits 5–7 contain the data link sequence number of the frame, each bit of which can take the values: 0, 1, 2, and 3.

Bits 8–15 contain the frame type identification field. The content of this frame is a sync frame (AD hex), or indicates if the frame contains data (10 hex), ack only, (01 hex), or data plus a piggybacked ack (11 hex).

The HDLC frame 40 data field 48 has a variable size of up to 122 octets of which 18 are reserved for higher level protocols and 104 for actual transport level data. Information is encapsulated inside the HDLC frame data field.

c. ACKNOWLEDGMENT/CONFIRMATION FRAME

This frame format 40 is only used by the CCU 12 to send to the TUs 14 for data link level acknowledgment and reservation confirmation. In addition to the standard HDLC fields, the CCU 12 acknowledgement/confirmation frame 40 includes inside the HDLC data field 46, two hundred fifty-six (256) additional acknowledgement and confirmation fields, one field per TU. One such TU field 60 is shown in FIG. 2C for a typical CCU 12 format. Each field consists of 2 bits, 1 bit 61 for acknowledgment and 1 bit 62 for confirmation of allocation of a transmission slot for the respective TU in the next up-link phase 21 of cycle 20. In the acknowledgement field 61, a zero indicates positive acknowledgement while a 1 indicates a negative acknowledgment. In the confirmation field 62 a 1 indicates allocation of a slot for the respective TU 14 in the next up-link phase 21, while a zero indicates no allocation of a slot. The size of the total set of 256 acknowledgement/confirmation fields 60 of CCU 12 acknowledgment/confirmation frame 29 is 72 octets. Since each TU receives the entire Ack frame 29 and since the 256 fields are algorithimically mapped in ROM to identify each of the 256 remote stations, thus, each TU knows precisely which ones and how many of the TUs 14 are scheduled in the next up-link phase 21 and it can locate its up-link slot by simply counting a predetermined amount of elapsed time.

4. DETAILED ADAPTIVE TDMA MAC LAYER PROTOCOL

The protocol of the present invention employs optimization techniques that allow better utilization of the shared channel. The topology is cellular in nature, where a CCU 12 coordinates the sharing of a channel among the TUs 14 in the same cell 11. Under this protocol, a TU 14 does not have to use a slot 25, 27, 27a in every cycle, but is allowed to make a reservation whenever it has data to transmit to the CCU 12.

A typical down-link phase 22 cycle starts by the CCU broadcasting an Ack frame 29 to all TUs 14. The first Ack frame 29 will allocate a slot for each TU 14 in the cell 11 by setting bit 61 to 0. The number of TUs 14 in a cell, N, is a programmable parameter in the CCU 12 code. After the transmission of the Ack frame 29, the CCU 12 transmits data frames addressed to the TUs 14 in its cell 11 for whom it has data. The CCU 12 then, broadcasts a Synch frame 23 to all TUs 14 in the cell 11. At this point the CCU 12 switches 24 to a receive mode and waits a number of slots equal to the number of TUs 14 it has programmed for transmission for this up-link phase 2 of this cycle 20.

TU 2, for example, upon receiving the Ack frame 29 from the CCU 12, schedules itself for transmission during the upcoming cycle by counting a predetermined time interval to its slot 27. For a TU, the cycle 20 starts at the instant it receives a Synch frame 23 from the CCU. If a TU is scheduled to transmit during the time slot, it waits for the beginning of that slot and transmits one data frame 40. A TU switches 26, 28 to the receive mode as soon as it finishes its transmission of its data frame.

During each transmission of a frame from the TU 14 to the CCU 12, the TU indicates whether it needs to continue transmitting during the following cycle. It does this by setting bit 1 in the HDLC frame control field 47a, as described above. The CCU 12 responds to this request by setting a 1 in the appropriate confirmation field 62 for that TU 14 in the Ack frame 29, and allocates a slot for that TU 14 in the upcoming cycle. The CCU 12 confirms the allocation of a slot to the TU 14 in its Ack frame broadcast during every cycle.

If the TU 14 does not request transmission during the upcoming cycle (bit 1 of control field 47a NOT set), it is dropped from the next up-link phase 21 of the next cycle 20 and is left in a suspended state for a while.

The TU might also be dropped by a higher-order software agent governed by its load analysis algorithm, thus, giving other TUs priority.

Suspended Stations Reentering the Cycle

The CCU 12, every k cycles of silence for each TU 14, polls the TU 14 to inquire whether the suspended TU 14 wants to resume inclusion in the up-link phases 21 of cycles of transmission.

Such a periodic polling mechanism is a simple matter to implement in software and hardware. For example, a counter may be incremented each time the "for" loop scanning all queues (open per TU) looking for a data buffer to transmit finds no data buffer present for a specific queue. The counter may be compared to a threshold set by a higher-order agent in the system (governed by a load analysis algorithm), and if the count exceeds the threshold the confirmation bit 62 (FIG. 2C) would be set to 1 for the TU in the next Ack frame. Thus, every k cycles an idle TU would be polled.

In addition, every time the CCU 12 schedules a TU 14 to receive a data frame 40 in a down-link slot 31 in the down-link phase 22, it also schedules the selected TU 14 for transmission in the upcoming up-link phase 2 by setting the confirmation bit 62 of the Ack frame 29 because CCU 12 anticipates at least an acknowledgment (Bit 0 in the HDLC frame control field 47a set to 0) to be returned from that TU 14 to the CCU 12. This allows the TU 14 to resume entering the transmission cycle again.

For example, during the initialization phase the CCU 12 gives all TUs 14 a reservation by setting bit 62 to 1 in the Ack frame 29, and its receive timing is set to listen in all slots 25, 27, 27a that there are TUs for. This makes for a long initial cycle. Meanwhile, all TUs 14 are in the listen mode and capture the Ack frame 29 containing reservation bits 62 for all TUs 14 including their own. Immediately following reception of the Ack frame 29, each TU 14 tests the "confirmation" bits found there and simply counts them in sequential order up to its own TU identification number (address). The value of this counter is the slot that it (the TU) will use for its response to the CCU 12. The term "reservation" and "confirmation" are complementary in that the TU sets a reservation request and the CCU confirms it in the Ack. A TU 14 responds back to the CCU 12 following receipt of the Synch frame 29 (which begins a new cycle) only if it had detected the CCU 12 confirmation bit 62, regardless of whether or not it had made a reservation in an earlier frame. This then is an example of explicit polling by the CCU 12 which may occur either when it (the CCU 12) has data to download to TU 14 (whether or not formerly idle), or it wishes to "test" a suspended or idle TU 14 to see if the TU 14 now has data to upload, or that the TU 14 is still within the cell and in a ready condition.

The higher-order software scheduling algorithm would normally not suspend a TU that continues to make a reservation (indicating a non-idle state) if the mean throughput of the system is at or below some critical threshold. When the system load profile (as determined by the algorithm) exceeds this threshold, the value of k determining the number of idle cycles imposed upon a TU would be adjusted according to a priority list, with higher priority TUs receiving a lower k number. Entries to the priority list may be hard-coded by default or modified by a higher-order command directed toward the CCU from some other source.

This heuristic adaptive scheduling algorithm optimizes the utilization of the shared channel particularly when the load profile from various TUs 14 is different. This is a substantial performance improvement over the conventional systems.

5. REPEATER UNIT, RU 15

As shown in FIG. 4, the Repeater Unit ("RU") 15 operates in cells 11 where the coverage of a particular CCU 12 is not broad enough to reach all TUs 14 in the cell 11. A subset of TUs 14a, 14b, which are in a blind region relative to the CCU 12, are served by a Repeater Unit 15. The RU 15 includes a CCU 17—TU 16 pair ("ccu-tu") connected back to back as shown in FIG. 4. The ccu 17 part of the RU operates as if it is a central control unit for a mini-cell 18 consisting of the region serving the TU's 14a, 14b that are in the blind region of the CCU 12 of the major cell 11. The ccu 17 needs to use its own localized PN code for its spread-spectrum radio.

Any up-link data frame 25, 27, 27a received from a TU 14a, 14b in the mini-cell 18 is passed through the UART channel of the ccu 17 to the UART channel of the attached tu 16. The tu 16 in turn acts as a regular TU 14 with respect to the CCU 12 of the major cell 11. The tu 16 needs to use for its spread-spectrum radio the PN code used by the major cell CCU 12.

Any down-link data frames 31 received by the tu 16 from the CCU 12 of the major cell 11 are forwarded directly to the attached ccu 17 of the RU 15 using the UART channel. These frames are then forwarded by the ccu 17 to the remote TUs 14a, 14b within the mini-cell 18. When a data frame is received by the RU 15 from either the ccu 17 or the tu 16, only the HDLC header and trailer are stripped while the inner information is encapsulated again by a new HDLC header and trailer for forwarding to the respective radio.

The present invention includes a hand off scheme for transient TUs. In a given cell, every TU contains a table indicating all of the neighboring cells' spread spectrum codes and its own cell code. If the TU moves from its original cell to another cell, it correlates with the new cell code better than the old one or any other one. This changeover is done during normal broadcast of signaling from the CCU coordinating communications in this new cell. The code table in the TU is updated to represent this new situation. This update may be done internally after the proper spreading code is determined (each cell code is tabled together with all of the adjacent cells' codes). The other possibility is that the CCU periodically broadcasts this table. Which one of the methods will be used depends on the particular situation at hand. A large number of cells may require CCU broadcasting, whereas a small number of cells may be handled by storing appropriate adjacent codes in the TU's memory.

6. SCHEDULING ACCESS TO THE SHARED CHANNEL (FIG. 3)

A typical system employing the present invention uses the following parameters:

HDLC Timing Scheme:

| | |
|---|---|
| Transmission Rate: | 334 kb/s |
| Transmission Delay: | 2.994 micro sec./bit. |
| Transmission Delay: | 23.952 micro sec./octet |

Frame types:

All of the following frames include one leading and one trailing flag octet.

Synch Frame:

Size = 12 octets.
Transmission Delay = 278.4 micro sec.

Data Frame:

Size = 26–130 octets.
Transmission Delay = 662.7–3,113.7 micro seconds

Ack Frame:

Size = 72 octets.
Transmission Delay = 1,724.4 micron sec.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a single channel, star configuration, wireless digital communication network of cellular topology wherein a central unit is radio frequency linked to a plurality of remote units and multiple access is synchronously controlled by the central unit through a time division multiplexed cycle, wherein the improvement comprises:
the cycle having a total cycle time of variable duration divided into two phases, one phase being an up-link phase and the other phase being a down-link phase which follows the up-link phase, each phase having a plurality of time slots in which information is transferred from the central unit to the remote units and from the remote units to the central unit, in the up-link phase, a variable number of fixed size data transfer time slots, each pre-assigned on request of a remote unit in an up-link phase of an immediately preceding cycle for use by the requesting remote in uploading data to the central unit in the up-link phase of the next succeeding cycle, and in the down-link phase, a variable number of variable size data transfer time slots for downloading data from the central unit to selected ones of the remote units.

2. The wireless digital communication network of claim 1 further comprising:

the request being in the form of a flag set in a control field of an information frame having a data packet transmitted by the requesting remote unit to the central unit in the up-link phase of the preceding cycle.

3. The wireless digital communication network of claim 2 further comprising:

a synchronization frame transmitted simultaneously to all of the remote units at the beginning of each up-link data transfer phase of the cycle.

4. The wireless digital communication network of claim 3 wherein the up-link time slots within which each remote unit transmits data information to the central unit are of equal duration.

5. The wireless digital communication network of claim 4 further comprising:

an acknowledgement frame transmitted simultaneously to all of the remote units in the network at the end of the up-link phase of each cycle.

6. The wireless digital communication network of claim 5 further comprising:

a confirmation signal selectively inserted in the data field of an acknowledgement frame addressed to each remote unit for whom a slot has been allocated in the next up-link cycle irrespective of whether an up-link slot was requested by each of them.

7. The wireless digital communication network of claim 6 wherein the location of a remote unit's pre-assigned data transfer time slot in a current up-link cycle is a function of the number of remote units scheduled by the central unit for transmission in the current up-link cycle ahead of the remote unit and independent of the number of active stations in the network.

8. The wireless digital communication network of claim 1 further comprising:

a synchronization frame transmitted simultaneously to all of the remote units at the beginning of each up-link data transfer phase of the cycle.

9. The wireless digital communication network of claim 1 wherein the up-link data transfer time slots are of equal duration.

10. The wireless digital communication network of claim 1 further comprising:

an acknowledgement frame transmitted simultaneously to all of the remote units in the network at the end of the up-link phase of each cycle.

11. The wireless digital communication network of claim 10 further comprising:

a confirmation signal selectively inserted in the data field of an acknowledgement frame addressed to each remote unit for whom a slot has been allocated in the next up-link cycle irrespective of whether an up-link slot was requested by each of them.

12. The wireless digital communication network of claim 11 wherein the location of a remote unit's pre-assigned data transfer time slot in a current up-link cycle is a function of the number of remote units scheduled by the central unit for transmission in the current up-link cycle ahead of the remote unit and independent of the number of active stations in the network.

13. The wireless digital communication network of claim 1 further comprising:

a confirmation bit being set in an acknowledgement frame, sent by a central unit immediately prior to the down-link phase of the cycle, to indicate to a remote unit for whom the central unit has traffic that a down-link transmission to that remote unit will be made by the central unit in the down-link phase of the current cycle.

14. The wireless digital communication network of claim 1 further comprising:

a suspend mode omitting assignment of an up-link time slot in the up-link phase of a next cycle for any remote unit which did not request one in an up-link phase of a current cycle.

15. The wireless digital communication network of claim 14 further comprising;

a polling signal transmitted in one cycle to each suspended remote unit to indicate reservation of an up-link slot for the remote unit in the next up-link cycle.

16. The wireless digital communication network of claim 15 wherein the polling signal is a confirmation bit set by the central unit in a data field of the acknowledgement frame transmitted by the central unit to all remote units at the end of the up-link phase of the cycle.

17. The wireless digital communication network of claim 14 further comprising;

a polling signal dependent upon an analysis algorithm transmitted every k cycles to each suspended remote unit to indicate reservation of an up-link slot for the remote unit in the next up-link cycle, where k is an integer.

18. The wireless digital communication network of claim 17 wherein the polling signal is a confirmation bit set by the central unit in a data field of the acknowledgement frame transmitted by the central unit to all remote units at the end of the up-link phase of the cycle.

19. The wireless digital communication network of claim 1 further comprising;

the network being a spread-spectrum TDMA communication network and operating in a spread spectrum mode.

20. The wireless digital communication network of claim 1 further comprising;

the central unit and its associated plurality of remote units forming a major cell, each remote unit and central unit operating in a spread-spectrum mode, a repeater unit having a local remote unit-local central unit pair coupled back to back to operate as a mini-cell within the major cell.

21. The wireless digital communication network of claim 20 further comprising;

the local remote unit operating with a spread spectrum code which is the same as the spread-spectrum code of the major cell central unit, and the local central unit operating with a different spread spectrum code.

22. In a single channel, star configuration, wireless digital communication network of cellular topology wherein a central unit is radio frequency linked to a plurality of remote units and multiple access is synchronously controlled by the central unit through a time division multiplexed cycle, wherein the improvement comprises:
   the cycle having a total cycle time of variable duration divided into two phases, one phase being an up-link phase and the other phase being a down-link phase which follows the up-link phase, each phase having a plurality of time slots in which information is transferred from the central units to the remote units and from the remote units to the central units,
   in the up-link phase, a variable number of fixed size time slots, each pre-assigned on request of a remote unit in a prior up-link phase for use by the requesting remote unit in uploading information to the central unit in the next up-link phase,
   in the down-link phase, a variable number of variable size time slots for downloading information from the central unit to selected ones of the remote units
   the central unit and its associated plurality of remote units forming a major cell,
   a repeater unit having a local remote unit-local central unit pair coupled back to back to operate as a mini-cell within the major cell, and
   frames from the major cell central unit received by the local remote unit of the back to back pair being passed through a UART channel of the local remote unit to a UART channel of the local central unit which in turn acts as a central unit to other remote units in the minicell and vice versa whereby the local remote unit acts as a regular remote unit in the major cell.

23. In a single channel, star configuration, wireless digital communication network of cellular topology wherein a central unit is radio frequency linked to a plurality of remote units and multiple access is synchronously controlled by the central unit through a time division multiplexed cycle,
   wherein the improvement comprises:
      the cycle having a total cycle time of variable duration divided into two phases, one phase being an up-link phase and the other phase being a down-link phase which follows the up-link phase, each phase having a plurality of time slots in which information is transferred from the central unit to the remote units and from the remote units to the central unit,
      in the up-link phase, a variable number of fixed size data transfer time slots for use in uploading data information to the central unit, and, in the down-link phase, a variable number of variable size time slots for use in downloading data information to the remote units, and
      the up-link variable being adaptively allocated by the central unit on demand by remote units with non-requesting units being temporarily suspended from the entire up-link phase of the cycle of the network until a predetermined condition is satisfied.

24. The wireless digital communication network of claim 23 further comprising:
   the down-link variables being adaptively allocated by the central unit based on the presence and amount of information for transmission to the remote units.

25. The wireless digital communication network of claim 23 wherein a parameter for allocating the up-link slots includes a request in the form of a flag set in a control field of an information frame having a data packet transmitted by a requesting remote unit to the central unit in the up-link phase of the preceding cycle.

26. In a process of a central unit, radio frequency linked in a star configuration to a plurality of remote units, synchronously controlling multiple access of the remote units to a single channel, wireless, digital, communication network of cellular topology through a cyclic time division multiplexed process,
   wherein the improvement comprises the steps of:
      providing a total cycle time of variable duration,
      dividing the cycle into two phases, one phase being an up-link phase and the other phase being a down-link phase which follows the up-link phase, each phase having a plurality of time slots in which information is transferred from the central unit to the remote units and from the remote units to the central unit,
      pre-assigning each of a variable number of fixed size up-link phase data transfer time slots on reservation by a remote unit in an up-link phase of an immediately preceding cycle for use by the reserving remote unit in uploading data to the central unit in the up-link phase of the next succeeding cycle, and
      providing a variable number of variable size down-link phase data transfer time slots for downloading data from the central unit to selected ones of the remote units.

27. The process of claim 26 further comprising the step of:
   the reserving remote unit setting a flag in a control field of an information frame having a data packet transmitted to the central unit in the up-link phase of the preceding cycle.

28. The process of claim 27 further comprising the step of:
   synchronizing the network with respect to a frame transmitted by the central unit simultaneously to all of the remote units at the beginning of each up-link data transfer phase of the cycle.

29. The process of claim 28 further comprising the step of:
   dividing equally in duration the up-link time slots within which each remote unit transmits data information to the central unit.

30. The process of claim 29 further comprising the step of:
   confirming the reservation in an acknowledgement frame transmitted simultaneously by the central unit to all of the remote units in the network at the end of the up-link phase of each cycle.

31. The process of claim 30 wherein the confirming step further comprises the step of:
   selectively addressing the confirmation signal in a data field of the acknowledgement frame to each remote unit for whom a slot has been allocated in the next up-link cycle irrespective of whether an up-link slot was requested by each of them.

32. The process of claim 31 wherein the confirming step of:
   determining a remote unit's pre-assigned data transfer time slot in a current up-link cycle as a function of the number of remote units scheduled by the central unit for transmission in the current up-link cycle ahead of the remote unit and independently of the number of active stations in the network.

33. The process of claim 26 further comprising the step of:
   synchronizing the network with respect to a frame transmitted by the central unit simultaneously to all of the remote units at the beginning of each data transfer up-link phase of the cycle.

34. The process of claim 26 further comprising the step of:
   dividing equally in duration the up-link time slots within which each remote unit transmits data information to the central unit.

35. The process of claim 26 further comprising the step of:
   confirming the reservation in an acknowledgement frame transmitted simultaneously by the central unit to all of the remote units in the network at the end of the up-link phase of each cycle.

36. The process of claim 35 wherein the confirming step further comprises the step of:

selectively addressing the confirmation signal in a data field of the acknowledgement frame to each remote unit for whom a slot has been allocated in the next up-link cycle irrespective of whether an up-link slot was requested by each of them.

37. The process of claim 36 wherein the confirming step of:

determining a remote unit's pre-assigned time data transfer slot in a current up-link cycle as a function of the number of remote units scheduled by the central unit for transmission in the current up-link cycle ahead of the remote unit and independently of the number of active stations in the network.

38. The process of claim 26 further comprising the step of:

setting a confirmation bit in an acknowledgment frame, sent by a central unit immediately prior to the down-link phase of the cycle, to indicate to a remote unit for whom the central unit has traffic that a down-link transmission to that remote unit will be made by the central unit in the down-link phase of the current cycle.

39. The process of claim 26 further comprising the step of:

suspending any remote unit which did not reserve an up-link time slot in the up-link phase of the preceding cycle by omitting assignment of an up-link time slot in the up-link phase of the succeeding cycle.

40. The process of claim 39 further comprising the step of:

polling each suspended remote unit in one cycle to indicate reservation of an up-link slot for the remote unit in the next up-link cycle.

41. The process of claim 40 wherein the polling step further comprises the step of:

setting a confirmation bit in a data field of an acknowledgement frame transmitted by the central unit to all remote units at the end of the up-link phase of the cycle.

42. The process of claim 39 further comprising the step of:

explicitly polling each suspended remote unit every k cycles to indicate reservation of an up-link slot for the remote unit in the next up-link cycle, where k is an integer.

43. The process of claim 42 wherein the polling step further comprises the step of:

setting a confirmation bit in a data field of an acknowledgement frame transmitted by the central unit to all remote units at the end of the up-link phase of the cycle.

44. The process of claim 26 further comprising the step of:

the network being a spread-spectrum TDMA communication network, operating the network in a spread spectrum mode.

45. The process of claim 26 further comprising the step of:

configuring the central unit and its associated plurality of remote units as a major cell, operating each remote unit and central unit in a spread-spectrum mode, providing a repeater unit having a local remote unit-local central unit pair coupled back to back to operate as a mini-cell within the major cell.

46. The process of claim 45 further comprising the step of:

operating the local remote unit with a spread spectrum code which is the same as the spread-spectrum code of the major cell central unit, and operating the local central unit with a different spread spectrum code.

47. In a process of a central unit, radio frequency linked in a star configuration to a plurality of remote units, synchronously controlling multiple access of the remote units to a single channel, wireless, digital, communication network of cellular topology through a cyclic time division multiplexed process, wherein the improvement comprises the steps of:

providing a total cycle time of variable duration, dividing the cycle into two phases, one phase being an up-link phase and the other phase being a down-link phase which follows the up-link phase, each phase having a plurality of time slots in which information is transferred from the central unit to the remote units and from the remote units to the central unit, pre-assigning each of a variable number of fixed size up-link phase time slots on reservation by a remote unit in a prior up-link phase for use by the requesting remote unit in uploading information to the central unit in the next up-link phase, providing a variable number of variable size down-link phase time slots for downloading data from the central unit to selected ones of the remote units configuring the central unit and its associated plurality of remote units as a major cell, providing a repeater unit having a local remote unit-local central unit pair coupled back to back to operate as a mini-cell within the major cell, and passing frames from the major cell central unit received by the local remote unit of the back to back pair through a UART channel of the local remote unit to a UART channel of the local central unit which in turn operates as a central unit to other remote units in the minicell and vice versa whereby the local remote unit operates as a regular remote unit in the major cell.

48. The process of claim 26 further comprising the step of:

the central control unit adaptively allocating the up-link variable on demand by remote units with non-requesting units being temporarily suspended from the entire up-link phase of the cycle of the network until ready to re-enter the network.

49. In a single channel, star configuration, wireless digital communication network of cellular topology wherein a central unit is radio frequency linked to a plurality of remote units and multiple access is synchronously controlled by the central unit through a time division multiplexed cycle, wherein the improvement comprises:

the cycle having a total cycle time of variable duration divided into two phases, one phase being an up-link phase and the other phase being a down-link phase which follows the up-link phase, each phase having a plurality of time slots in which information is transferred from the central unit to the remote units and from the remote units to the central unit, in the up-link phase, a variable number of fixed size data transfer time slots, each pre-assigned on request of a remote unit in one up-link phase of a cycle for use by the requesting remote in uploading data to the central unit in another up-link phase of a cycle, and in the down-link phase, a variable number of variable size data transfer time slots for downloading data from the central unit to selected ones of the remote units.

50. In a single channel, star configuration, wireless digital communication network of cellular topology wherein a central unit is radio frequency linked to a plurality of remote units and multiple access is synchronously controlled by the central unit through a time division multiplexed cycle, wherein the improvement comprises:
  the cycle having a total cycle time of variable duration divided into two phases, one phase being an up-link phase and the other phase being a down-link phase which follows the up-link phase, each phase having a plurality of time slots in which information is transferred from the central unit to the remote units and from the remote units to the central unit,
  in the up-link phase, a variable number of data transfer time slots, each pre-assigned on request of a remote unit in an up-link phase of an immediately preceding cycle for use by the requesting remote in uploading data to the central unit in the up-link phase of the next succeeding cycle, and
  in the down-link phase, a variable number of variable size data transfer time slots for downloading data from the central unit to selected ones of the remote units.

* * * * *